United States Patent
Oda et al.

[19]

[11] Patent Number: 6,155,130
[45] Date of Patent: Dec. 5, 2000

[54] COLUMN SHIFT DEVICE FOR AUTOMATIC TRANSMISSION

[75] Inventors: Shigeaki Oda, Shizuoka; Katsunori Okuno, Wako, both of Japan

[73] Assignees: Kabushiki Kaisha Atsumitec, Shizuoka; Honda Giken Kogyo Kabushiki Kaisha, Tokyo, both of Japan

[21] Appl. No.: 09/219,859

[22] Filed: Dec. 23, 1998

[30] Foreign Application Priority Data

Dec. 26, 1997 [JP] Japan .................................. 9-360045

[51] Int. Cl.$^7$ .................................................. B60K 20/06
[52] U.S. Cl. ........................................ 74/473.31; 74/473.3
[58] Field of Search ........................... 74/473.1, 473.31, 74/473.3, 471 R

[56] References Cited

U.S. PATENT DOCUMENTS

| | | | |
|---|---|---|---|
| 2,905,016 | 9/1959 | Gorsky | 74/475 |
| 3,768,330 | 10/1973 | Gejoff | 74/484 |
| 4,733,573 | 3/1988 | Kramer | 74/473 SW |
| 5,146,805 | 9/1992 | Harkradr et al. | 74/473 SW |

FOREIGN PATENT DOCUMENTS

| | | |
|---|---|---|
| 5-42841 | 2/1993 | Japan . |
| 8-282317 | 10/1996 | Japan . |

*Primary Examiner*—David Fenstermacher
*Attorney, Agent, or Firm*—Armstrong, Westerman, Hattori, McLeland & Naughton

[57] ABSTRACT

In a column shift device, a pivot is secured to a shift piece on which a shift lever is supported. A support bore, in which the pivot is rotatably fitted, is provided in a bracket, so that the shift piece can be turned around the pivot to any of a plurality of shift positions. Turning slide surfaces each having a diameter larger than an effective length of the pivot are formed on those opposed surfaces of the bracket and the shift piece which abut against each other in the axial direction of the pivot. Much of load applied to the shift piece is borne by the turning slide surfaces. Thus, even if a relatively short pivot is used, the shift piece can be supported stably on the bracket, and the column shift device can be made compact.

4 Claims, 13 Drawing Sheets

COLUMN SHIFT DEVICE FOR AUTOMATIC TRANSMISSION

BACKGROUND OF THE INVENTION

1. Field of the Invention

The present invention relates to a column shift device for an automatic transmission of a vehicle such as an automobile, and particularly, to an improvement in a column shift device for an automatic transmission of an automobile, including a bracket mounted to a steering column, a shift piece on which a shift lever is supported, a pivot secured to one of the bracket and the shift piece, and a support bore provided in the other of the bracket and the shift piece, the pivot being rotatably fitted in the support bore, so that the shift piece can be turned about the pivot to any of a plurality of shift positions.

2. Description of the Related Art

Such a column shift device is already known, as disclosed, for example, in Japanese Patent Application Laid-open No.5-42841. In such column shift device, the shift piece bearing the weight and shifting force of the shift lever is cantilever-supported on the bracket through the pivot. Therefore, in order to stabilize the supporting of the shift piece, the pivot in the known device is formed of a large diameter and a large length, and the supporting area for the pivot is set as large as possible.

However, the formation of the pivot at a large length brings about an increase in size of the shift device, making it difficult to place the shift device in a narrow space in front of a steering wheel of an automobile.

SUMMARY OF THE INVENTION

Accordingly, it is an object of the present invention to provide a column shift device of the above-described type, wherein even if a relatively short pivot is used, the shift piece can be supported stably on the bracket.

To achieve the above object, according to the present invention, there is provided a column shift device for an automatic transmission, comprising a bracket mounted to a steering column, a shift piece on which a shift lever is supported, a pivot secured to one of the bracket and the shift piece, and a support bore provided in the other of the bracket and the shift piece, the pivot being rotatably fitted in the support bore, so that the shift piece can be turned about the pivot to any of a plurality of shift positions, wherein the bracket and the shift piece have turning slide surfaces formed on opposed surfaces thereof which are in abutment against each other in an axial direction of the pivot, each of the turning slide surfaces having a diameter larger than an effective length of the pivot.

With such first feature, those turning slide surfaces of the bracket and shift piece which have the diameter larger than the effective length of the pivot abut against each other. Therefore, much of load applied to the shift piece can be borne not only by the pivot but also by the turning slide surfaces of the bracket and shift piece, enabling the shift piece to be supported on the bracket stably. As a result, the length of the pivot can be reduced, which contributes to a compactness of the column shift device.

According to a second aspect and feature of the present invention, in addition to the first feature, a thrust plate is interposed between the turning slide surfaces of the bracket and the shift piece, and has a friction coefficient lower than friction coefficients of the turning slide surfaces.

With such second feature, the turning resistance between the bracket and the shift piece is reduced, thus making it possible to perform the operation of the shift lever lightly.

The above and other objects, features and advantages of the invention will become apparent from the following description of the preferred embodiment taken in conjunction with the accompanying drawings.

DETAILED DESCIPTION OF THE PREFERRED EMBODIMENT

The present invention will now be described by way of an embodiment with reference to the accompanying drawings.

Figure 4:
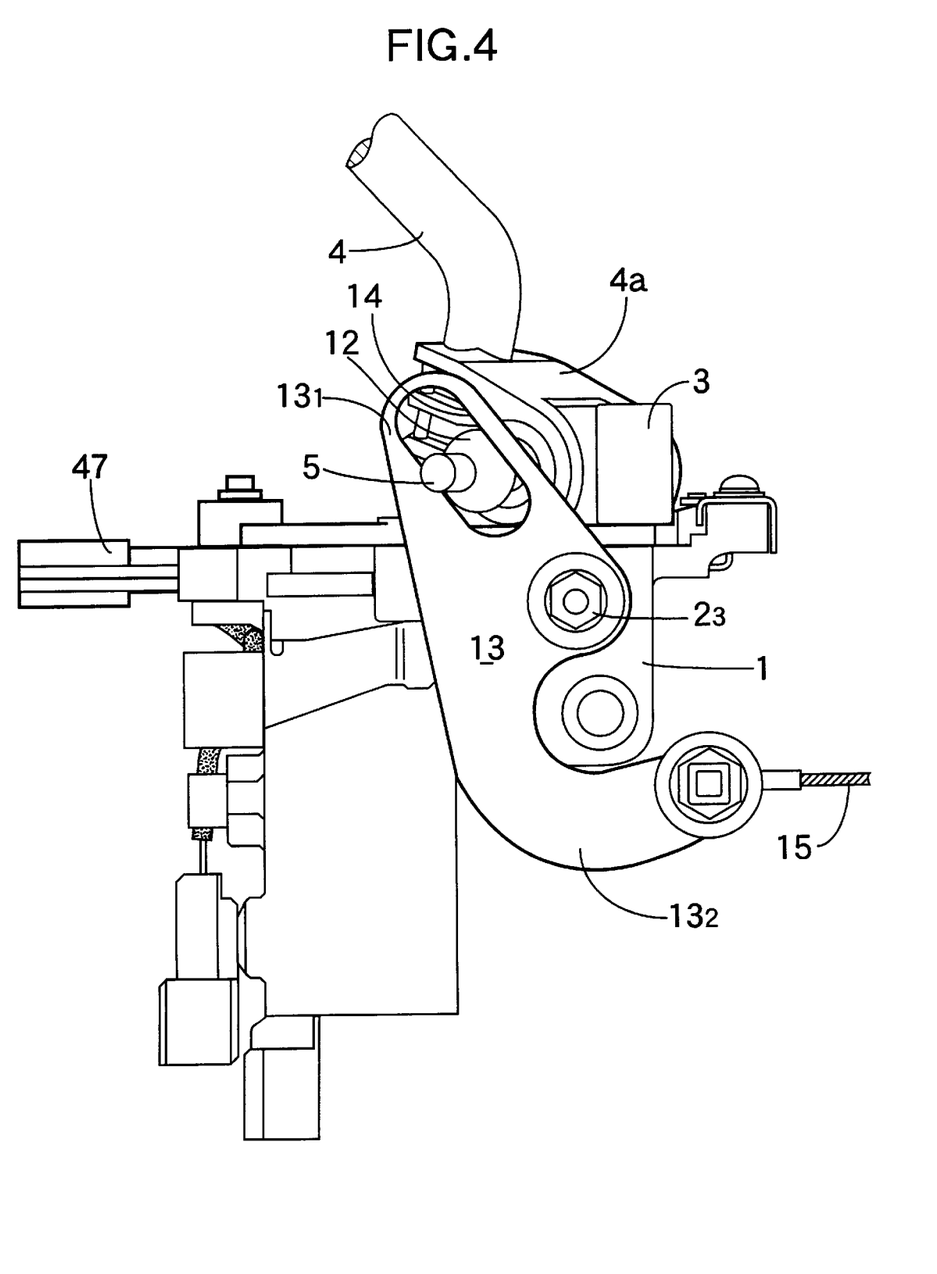
FIG. 4 is a view (a bottom view) taken in the direction of an arrow 4 in FIG. 1.
Figure 5:
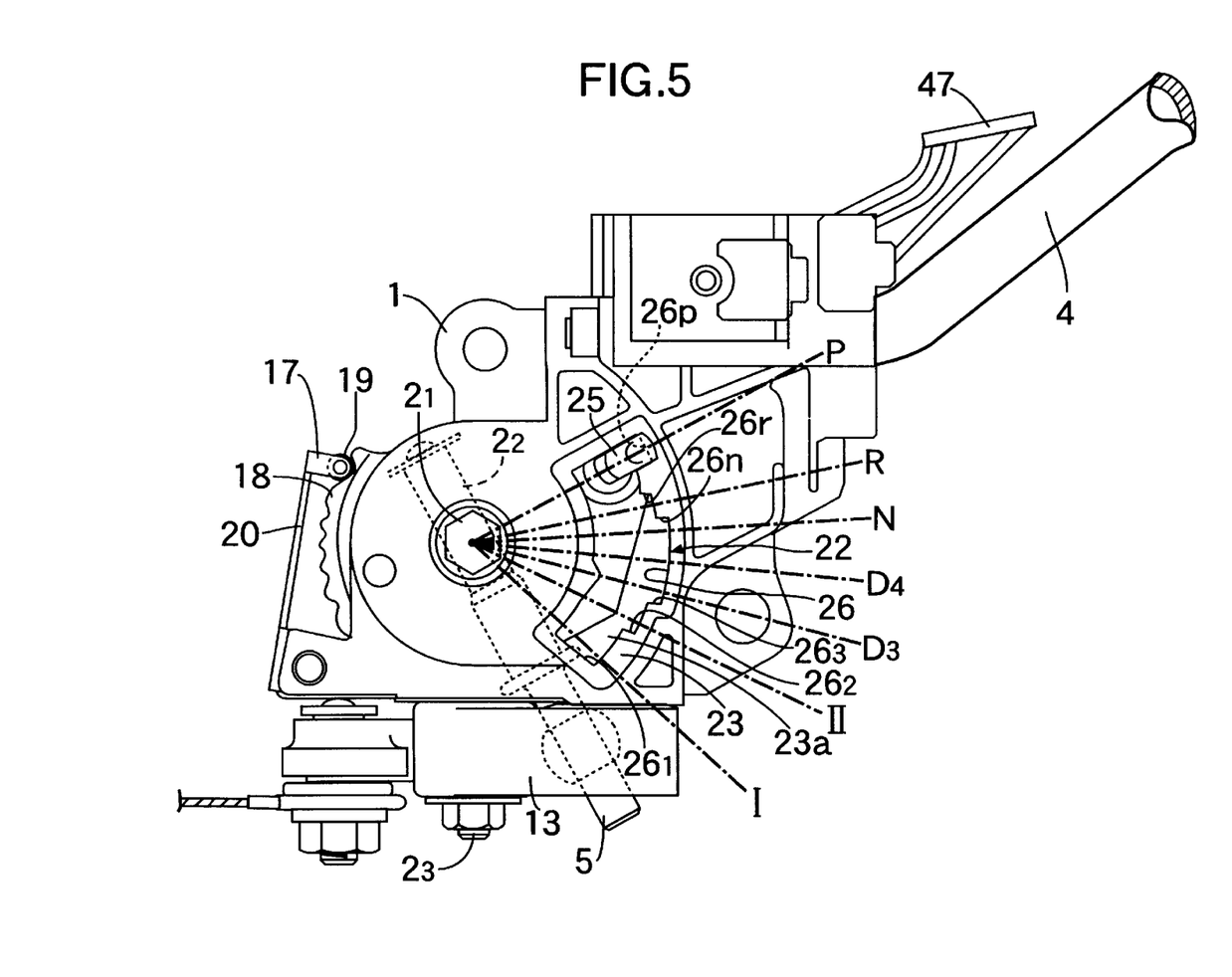
FIG. 5 is a view (a left side view) taken in the direction of an arrow 5 in FIG. 3.
Figure 6:
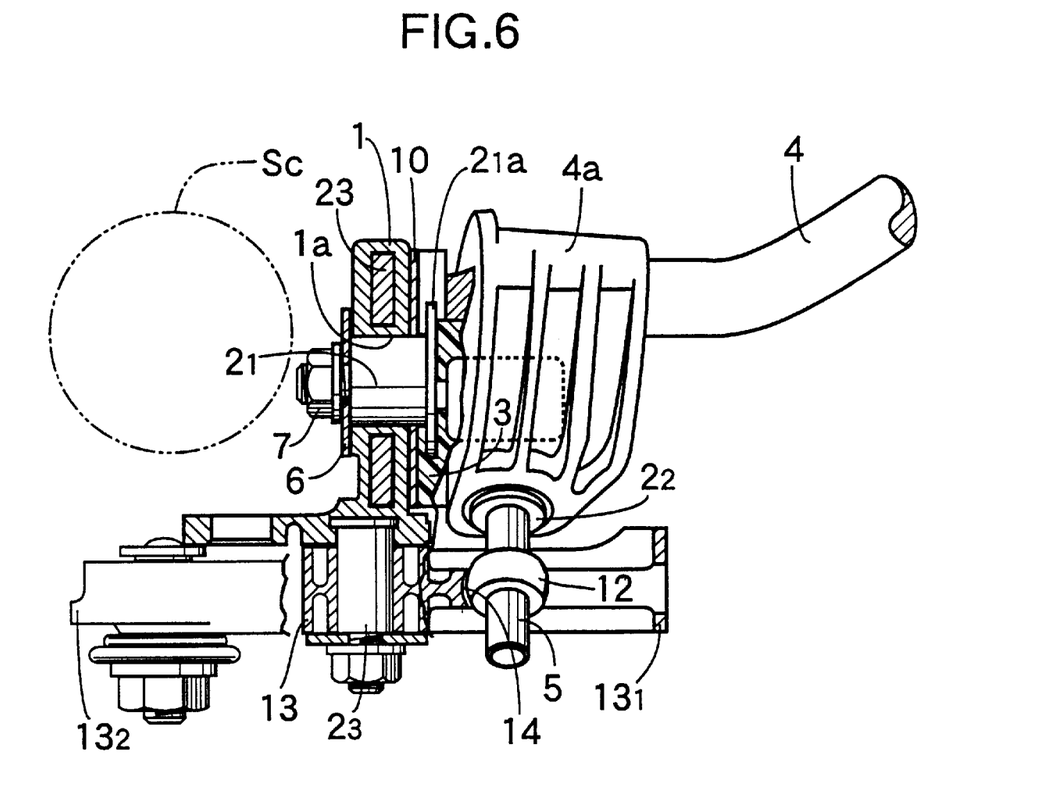
FIG. 6 is a view taken in the direction of an arrow 6—6 in FIG. 1.
Figure 7:
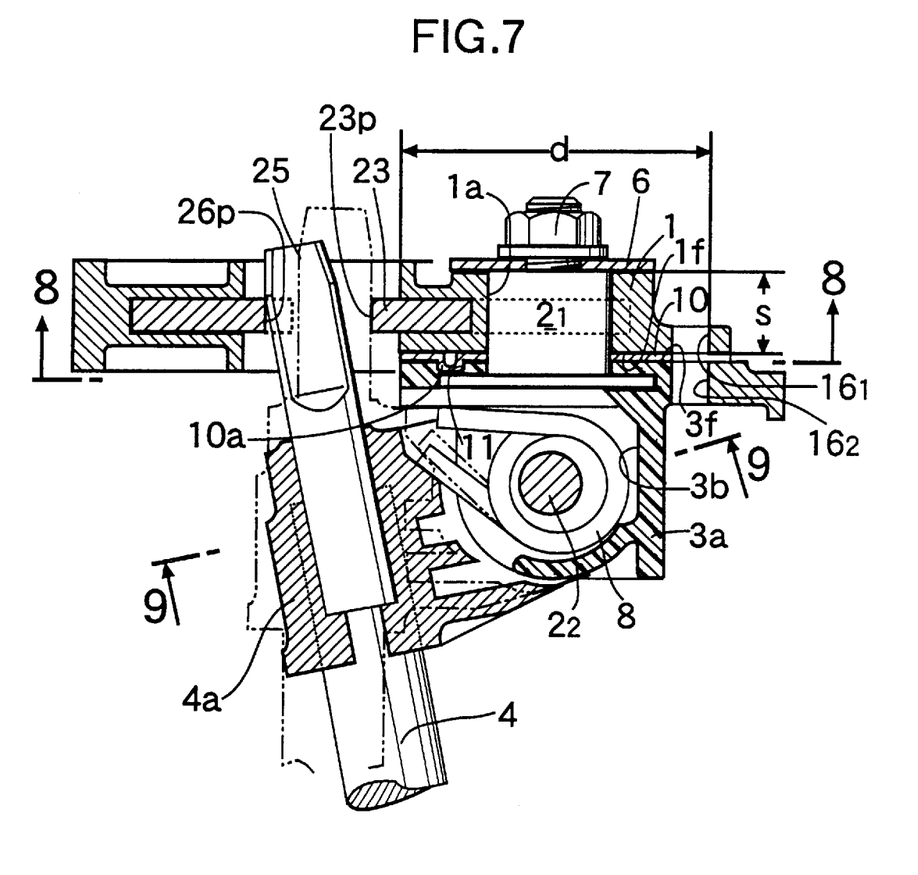
FIG. 7 is a sectional view taken along a line 7—7 in FIG. 1.

Referring first to FIGS. 1 to 7, a column shift device includes a bracket 1 made of a synthetic resin and secured to a steering column Sc adjacent a steering wheel Sw of an automobile. As shown in FIGS. 6 and 7, a support bore 1a having an axis extending in a lateral direction of a vehicle is provided in the bracket 1, and a shift piece 3 made of a synthetic resin is turnably connected to the bracket 1 through a first pivot $2_1$ fitted in the support bore 1a. A base end of the first pivot $2_1$ which has an anchor flange $2_1a$ is coupled by molding to the shift piece 3, and a slip-off preventing plate 6 is secured to a tip end of the first pivot $2_1$ by a nut 7 to abut against an outer end surface of the bracket 1.

Figure 8:
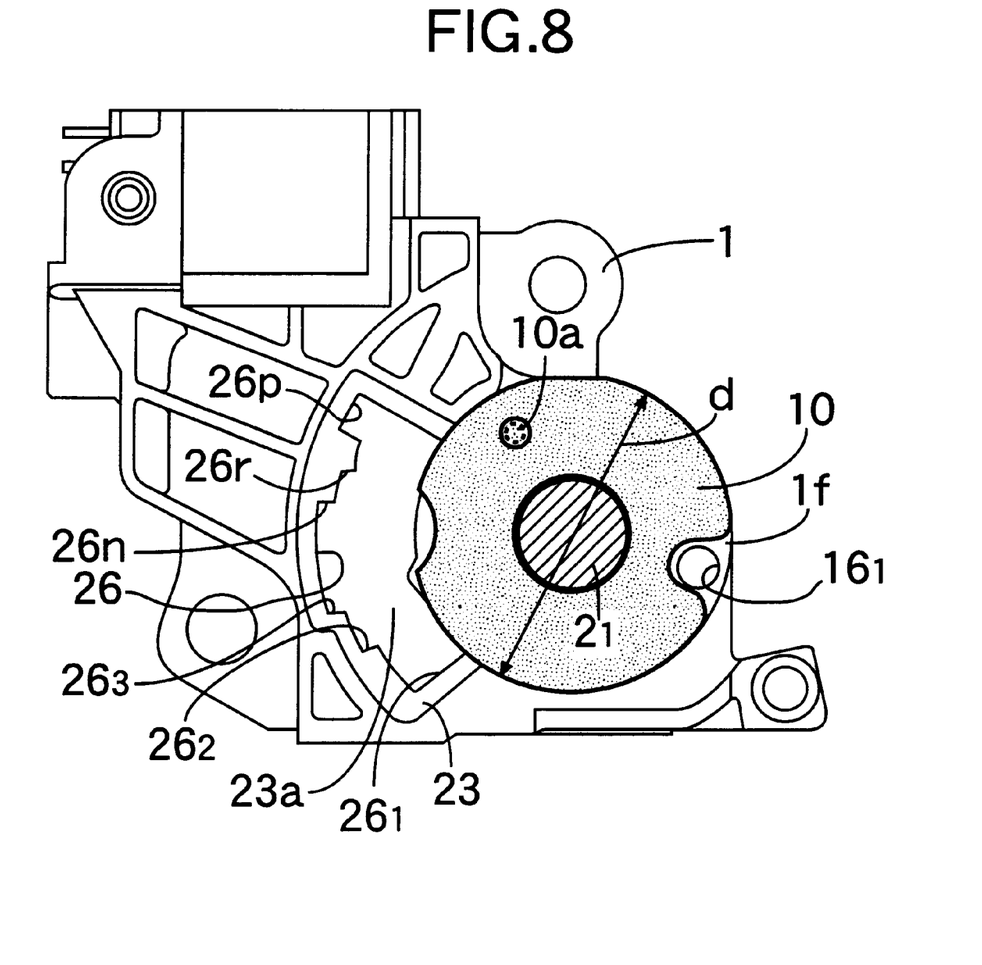
FIG. 8 is a sectional view taken along a line 8—8 in FIG. 7.
Figure 9:
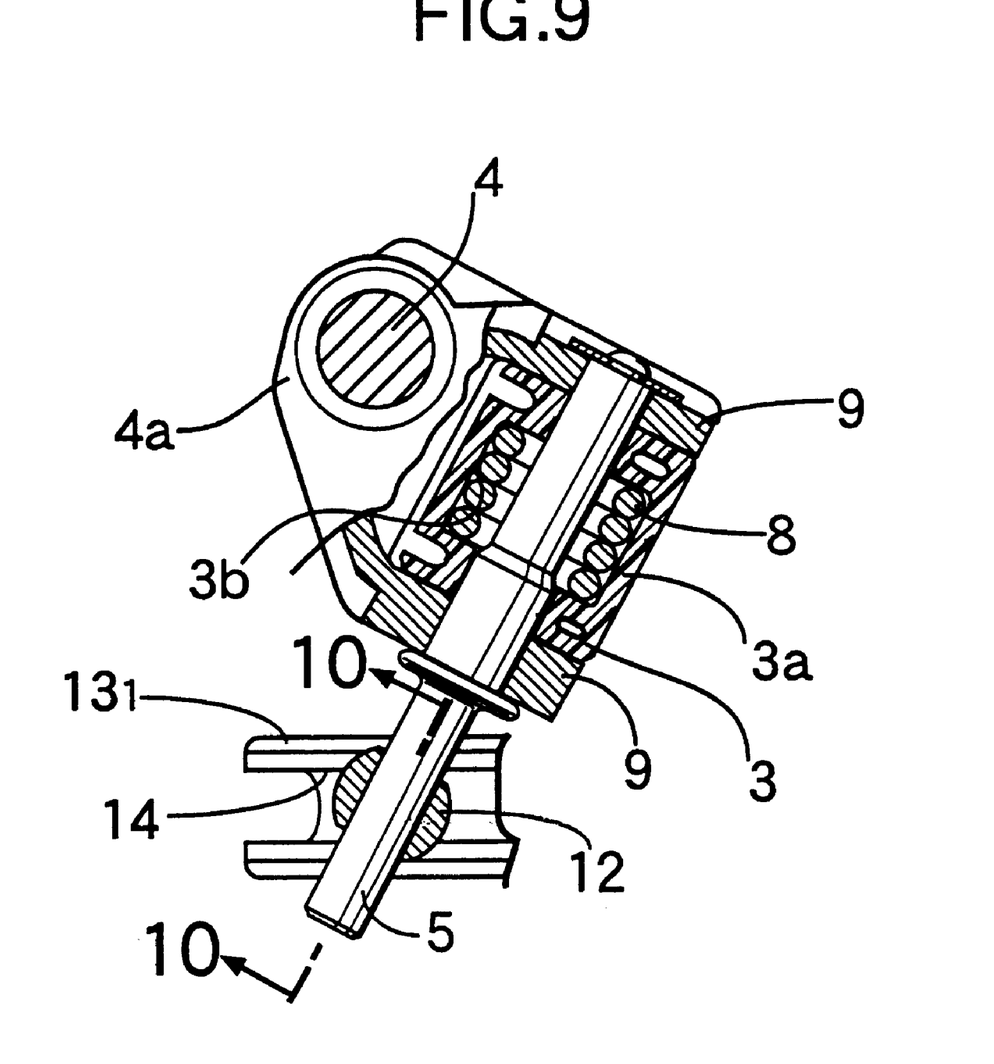
FIG. 9 is a sectional view taken along a line 9—9 in FIG. 7.
Figure 10:
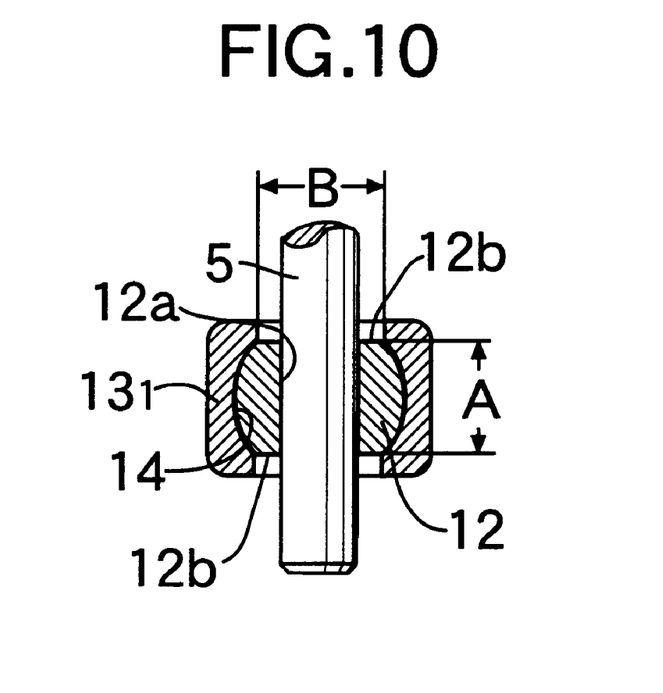
FIG. 10 is a sectional view taken along a line 10—10 in FIG. 9.

As shown in FIGS. 7 and 8, turning slide surfaces 1f and 3f having a diameter d several times an effective length s of the first pivot $2_1$ are formed respectively on opposed surfaces of the bracket 1 and the shift piece 3 which are opposed to each other in an axial direction of the first pivot $2_1$. These surfaces are adapted to be turned and slid with a thrust plate 10 interposed therebetween.

The thrust plate 10 is formed of a material having a friction coefficient lower than those of the bracket 1 and the shift piece 3. For example, if each of the bracket 1 and the shift piece 3 is made of a polyamide 66 resin, the thrust plate 10 is made of an acetal resin. A positioning projection 10a is formed on the thrust plate 10 and fitted into a positioning bore 11 which is provided in either one of the bracket 1 and the shift piece 3 (in the shift piece 3 in the illustrated embodiment). Therefore, in the illustrated embodiment, when the bracket 1 and the shift piece 3 are rotated relative to each other, the turning and sliding movements are produced between the thrust plate 10 and the turning slide surface 1f of the bracket 1.

The bracket 1 and the shift piece 3 are provided with tool bores $16_1$ and $16_2$ parallel to the first pivot $2_1$, respectively. The tool bores $16_1$ and $16_2$ are matched with each other at a parking position P of the shift piece 3 which will be described hereinafter. If a suitable tool is inserted into the tool bores $16_1$ and $16_2$ at the parking position P, the relative rotation of the bracket 1 and the shift piece 3 can be restricted to conduce to the convenience for the transportation and assembling of the column shift device.

Figure 1:
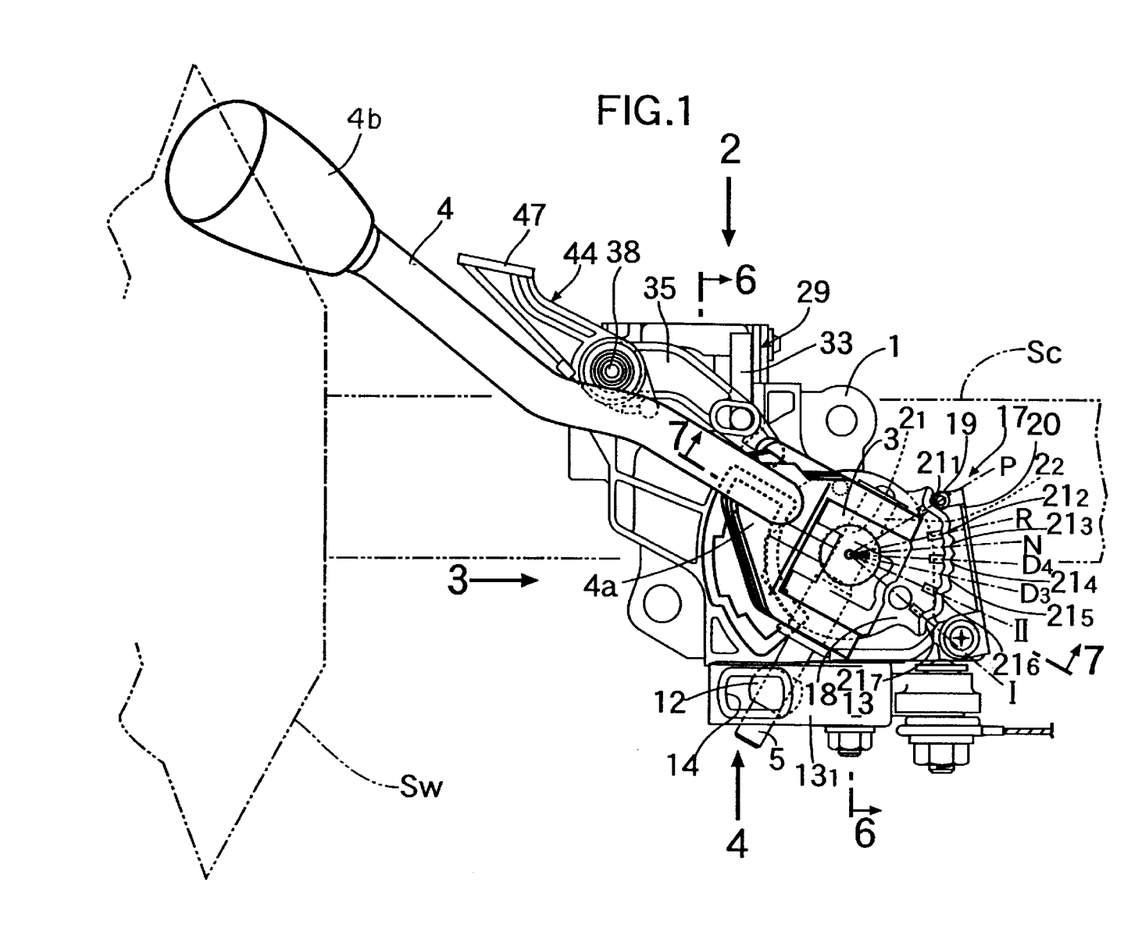
FIG. 1 is a right side view of a column shift device for an automatic transmission.
Figure 2:
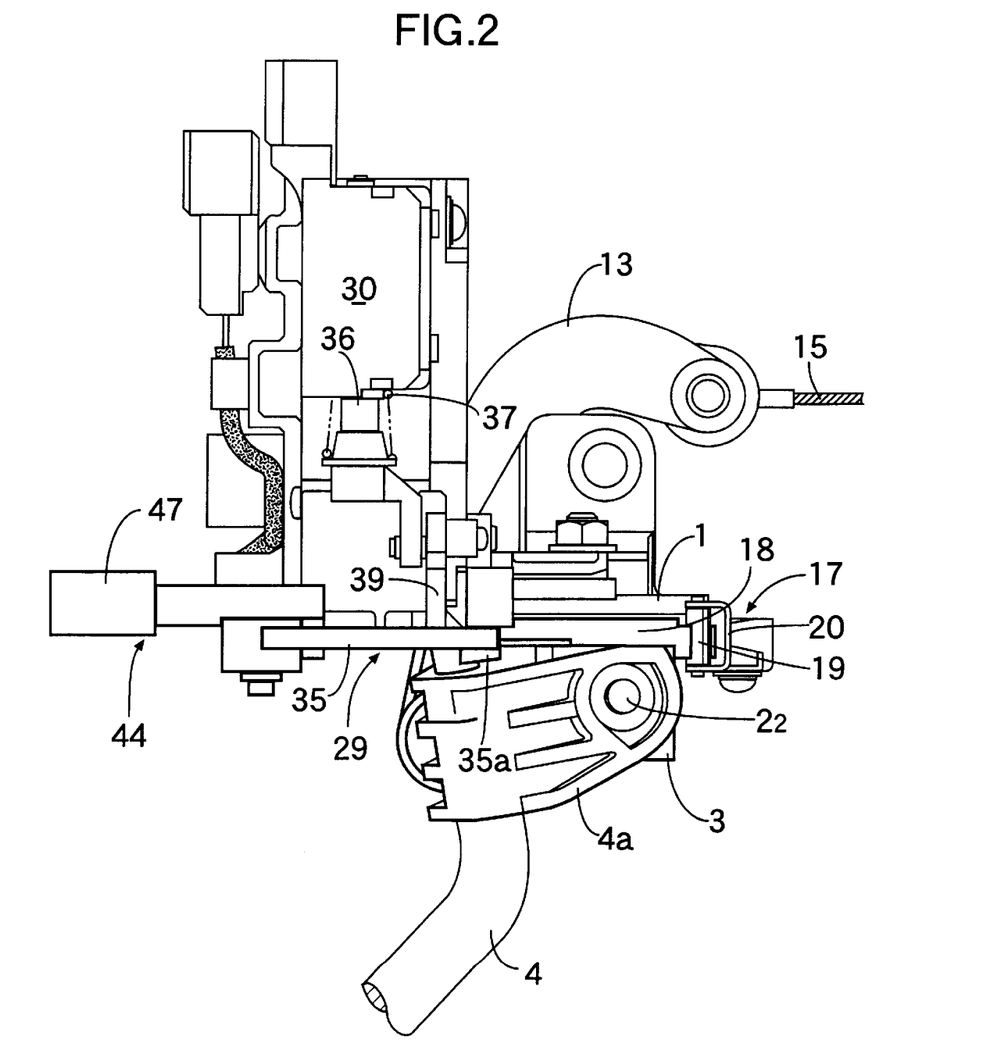
FIG. 2 is a view (a plan view) taken in the direction of an arrow 2 in FIG. 1.
Figure 3:
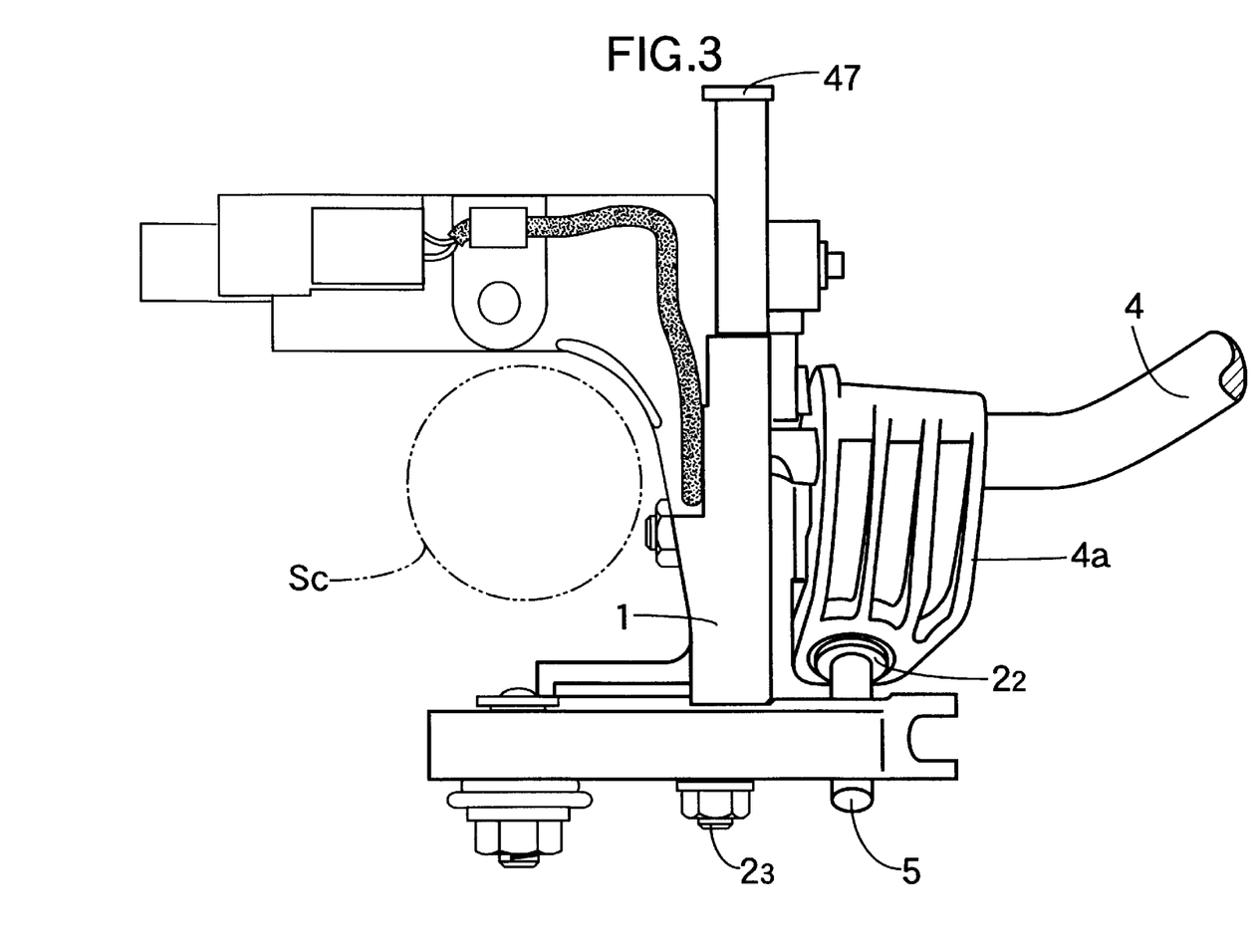
FIG. 3 is a view (a front view) taken in the direction of an arrow 3 in FIG. 1.

As shown in FIGS. 1, 6 and 7, the shift piece 3 is integrally provided with a boss 3a which protrudes in a direction opposite from the first pivot $2_1$, and a boss member 4a at a base portion of a shift lever 4 is turnably connected to the boss 3a through a second pivot $2_2$ which is disposed in a plane adjacent and substantially perpendicular to the axis of the first pivot $2_1$. The boss member 4a, which is made of a synthetic resin, is coupled in a molded manner to the base portion of the shift lever 4 and integrally provided with a pair of support arms 9 opposed to each other with the boss 3a of the shift piece 3 interposed therebetween. The support arms 9 fixedly support the second pivot $2_2$ extending through the shift piece 3. The shift lever 4 has a knob 4b provided at its tip end.

A recess 3b is defined in one side of the boss 3a of the shift piece 3. A coiled portion of a set spring 8 comprising a torsion coil spring mounted on the second pivot $2_2$ is accommodated in the recess 3b and locked at its opposite ends in the shift piece 3 and the boss member 4a, respectively. Thus, the shift lever 4 is biased in a given direction around the second pivot $2_2$. The biasing direction will be described hereinafter.

As shown in FIGS. 1, 6, 7, 9 and 10, the second pivot $2_2$ is integrally provided with an arm shaft 5 which protrudes outwards over a long length from one of the support arms 9 of the boss member 4a. A spherical joint member 12 made of a synthetic resin is slidably fitted over an outer peripheral surface of the arm shaft 5. On the other hand, a shift link 13 having first and second arms $13_1$ and $13_2$ are swingably supported on a lower surface of the bracket 1 through a third pivot $2_3$. A guide groove 14 is defined in the first arm $13_1$ and extends rectilinearly in a direction intersecting a direction of turning movement of the first arm $13_1$ about the first pivot $2_1$. The guide groove 14 opens into opposite surfaces of the first arm $13_1$ and is arcuate in section, and the joint member 12 is slidably engaged in the guide groove 14. The joint member 12 has chamfered portions 12b formed on its opposite sides into which an axial bore 12a with the arm shaft 5 slidably fitted therein opens. The distance A between the chamfered portions 12b is set slightly smaller than the width B of the guide groove 14.

Figure 11:
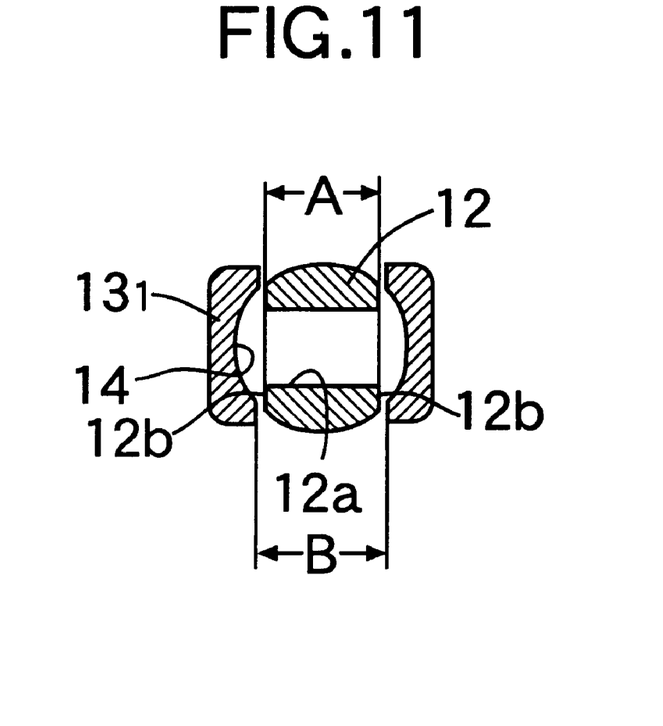
FIG. 11 is a view similar to FIG. 10 for explaining the operation.

To assemble the column shift device, the joint member 12 is inserted in a single state into the guide groove 14 with its chamfered portions 12b turned toward the arcuate surface of the guide groove 14, as shown in FIG. 11. Then, the joint member 12 is turned through approximately 90°, so that the chamfered portions 12b are turned toward an opened surface of the guide groove 14, whereby the spherical portion thereof is mated with the arcuate surface of the guide groove 14. Thereafter, the arm shaft 5 is fitted into the shaft bore 12a. If the operation is conducted in this manner, the joint member 12 cannot leave the guide groove 14, because the returning of the joint member 12 to an angle provided upon insertion thereof in the guide groove 14 is restricted by the arm shaft 5.

A control wire 15 connected to a manual valve (not shown) of an automatic transmission is connected to the second arm $13_1$ of the shift link 13 (see FIG. 4).

As shown in FIG. 1, the shift piece 3 is turned around the first pivot $2_1$ by the shift lever 4 to any of seven shift positions: the parking position P, a reverse position R, a neutral position N, a fourth gear shift drive position $D_4$, a third gear shift drive position $D_3$, a second gear shift holding position II and a first gear shift holding position I. A detent mechanism 17 for retaining the shift lever 4 at any of the shift positions is provided between the bracket 1 and the shift piece 3. This mechanism 17 includes a detent plate 18 flat-shaped about the first pivot $2_1$ and integrally formed on the shift piece 3, and a detent spring 20 secured at its base end to the bracket 1 and having a positioning roller 19 carried at its tip end. Seven V-shaped notches $21_1$, $21_2$, $21_3$, $21_4$, $21_5$, $21_6$ and $21_7$ corresponding to the shift positions P to I of the shift piece 3 are provided around an outer peripheral surface of the detent plate 18, so that the positioning roller 19 is brought into engagement in any of the notches $21_1$ to $21_7$ corresponding to the shift positions of the shift lever 4 by a resilient force of the detent spring 20. Thus, the shift piece 3 and the shift lever 4 can be retained at each of the shift positions, and a feeling of moderation can be provided to an operator.

In addition, as shown in FIG. 5, a shift restraining mechanism 22 for providing a given restraint to the shifting operation of the shift lever 4 is provided between shift lever 4 and the bracket 1. The mechanism 22 includes a limiting plate 23 coupled in a molded manner to the bracket 1, and an engage claw 25 fixedly provided at the base portion of the shift lever 4 to engage a cam surface 26 formed on a radially outer-side inner peripheral edge of a window 23a in the limiting plate 23, which is fan-shaped about the first pivot $2_1$. The cam surface 26 has a P-position maintaining groove 26p, an R-position limiting step 26r, an N-position limiting step 26n, a $D_3$-position limiting step $26_3$, an II-position limiting step $26_2$ and an I-position limiting step $26_1$, which correspond to the positions P, R, N, $D_3$, II and I of the shift lever 4, respectively. The set spring 8 biases the shift lever 4 in a direction to bring the engage claw 25 into engagement with the cam surface 26.

Thus, if the shift lever 4 is turned about the second pivot $2_2$ against the biasing force of the set spring 8 by an operator pulling the knob 4a of the shift lever 4 toward himself, the engage claw 25 is caused to leave the cam surface 26, so that it is released from the limiting action thereof. Therefore, if the shift lever 4 is then turned about the first pivot $2_1$, the shift lever 4 can be shifted to desired one of the shift position P to I attendant with the second pivot $2_2$ and the shift piece 3. During this time, the arm shaft 5 integral with the second pivot $2_2$ swings the shift link 13 through the joint member 12 and hence, the control wire 15 connected to the shift link 13 is pulled or pushed to provide a shift control position corresponding to the shift portion of the shift lever 4 to the manual valve of the automatic transmission.

The spherical joint member 12 is slidably fitted over the arm shaft 5 and engaged in the rectilinear guide groove 14 in the shift link 13, and hence, during the turning of the arm shaft 5 about the first pivot $2_1$, the joint member 12 provides the turning of the shift link 13, while being slid on the arm shaft 5 and at the same time, being moved rectilinearly along the guide groove 14. Thus, it is possible to provide a large shift stroke to the shift valve of the automatic transmission.

The shift piece 3 supporting the shift lever 4 of the large weight and the like is turnably connected to the bracket 1 through the relatively short first pivot $2_1$. However, since the bracket 1 and the shift piece 3 have the turning slide surfaces 1f and 3f of the diameters d several times larger than the effective length a of the first pivot $2_1$, which are in abutment against each other, much of the load applied to the shift piece 3 can be borne not only by the first pivot $2_1$ but also by the turning slide surfaces 1f and 3f to stably support the shift piece 3 on the bracket 1. Therefore, the inclination of the shift piece 3 can be prevented effectively. At the same time, the column shift device can be made compact by employment of the relatively short first pivot $2_1$.

Moreover, since the thrust plate 10 having the lower friction coefficient is interposed between both of the turning slide surfaces 1f and 3f, the resistance of turning movement between the bracket 1 and the shift piece 3 is extremely small for the reason that the bracket 1 and the shift piece 3 are made of the synthetic resin and hence, the operation of the shift lever 4 can be performed lightly.

As shown in FIGS. 1, 2, 12 and 13, a shift lock mechanism 29 is provided on the bracket 1. When the shift lever 4 assumes the position P, the mechanism 29 locks the shift lever 4 at the position P, unless a brake of the vehicle is operated. The mechanism 29 includes a lock lever 35 which is carried at 38 on one side of the bracket 1 opposed by the boss member 4a of the shift lever 4 for swinging movement between a locking position L (see FIG. 12) and an unlocking position U (see FIG. 13). At the locking position L, when the shift lever 4 assumes the position P, a thicker portion 35a at a tip end of the lock lever 35 is interposed between opposed surfaces of the boss member 4a and the bracket 1, so that the turning movement of the shift lever 4 about the second pivot $2_2$ is inhibited. To operate the lock lever 35, an electromagnetic actuator 30 is mounted to the upper surface of the bracket 1, and an operating rod 36 of the electromagnetic actuator 30 is connected to the lock lever 35 through a bell crank 33 carried at 39 on the upper surface of the bracket 1. The electromagnetic actuator 30 is provided with a lock spring 37 adapted to bias the operating rod 36 toward the locking position L of the lock lever 35. The electromagnetic actuator 30 has a solenoid connected to a battery through a braking operation sensing switch (not shown) which is closed in response to the depression of a brake pedal.

Figure 12:
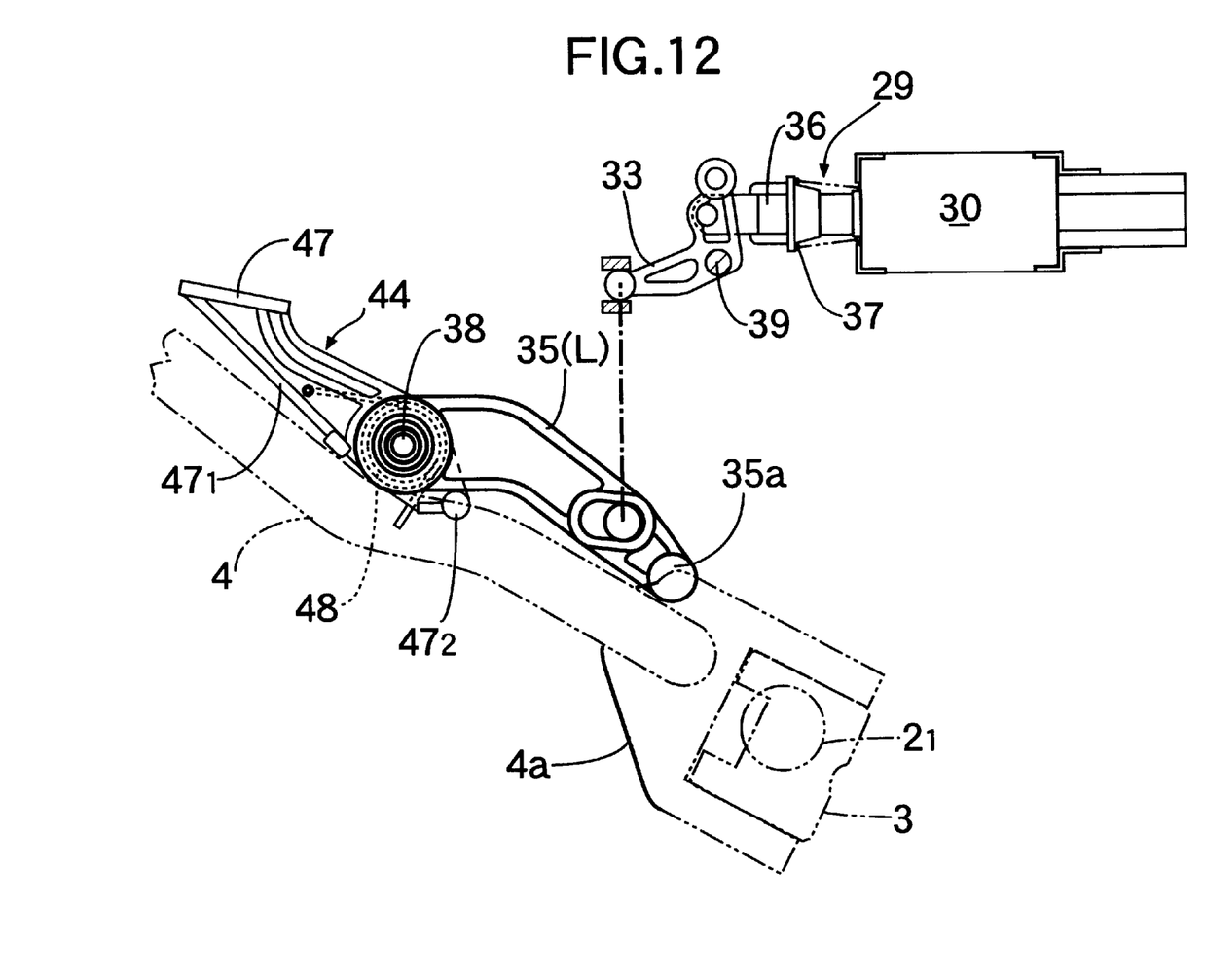
FIG. 12 is an exploded view of a shift lock device and a forcibly lock-releasing mechanism.

When in a state in which the shift lever 4 assumes the position P and the engage claw 25 is in engagement in the P-position maintaining groove 26p, if the brake pedal is in a resting position, the lock lever 35 is retained at the locking position L by a resilient force of the lock spring 37 of the electromagnetic actuator 30, and the turning movement of the shift lever 4 about the first pivot $2_1$ is restricted by the interposition of the thicker portion 35a at the tip end of the lock lever 35 between the opposed surfaces of the boss member 4a and the bracket 1. As a result, the engage claw 25 cannot be escaped from the P-position maintaining groove 26p and hence, the shift lever 4 cannot be operated.

Figure 13:
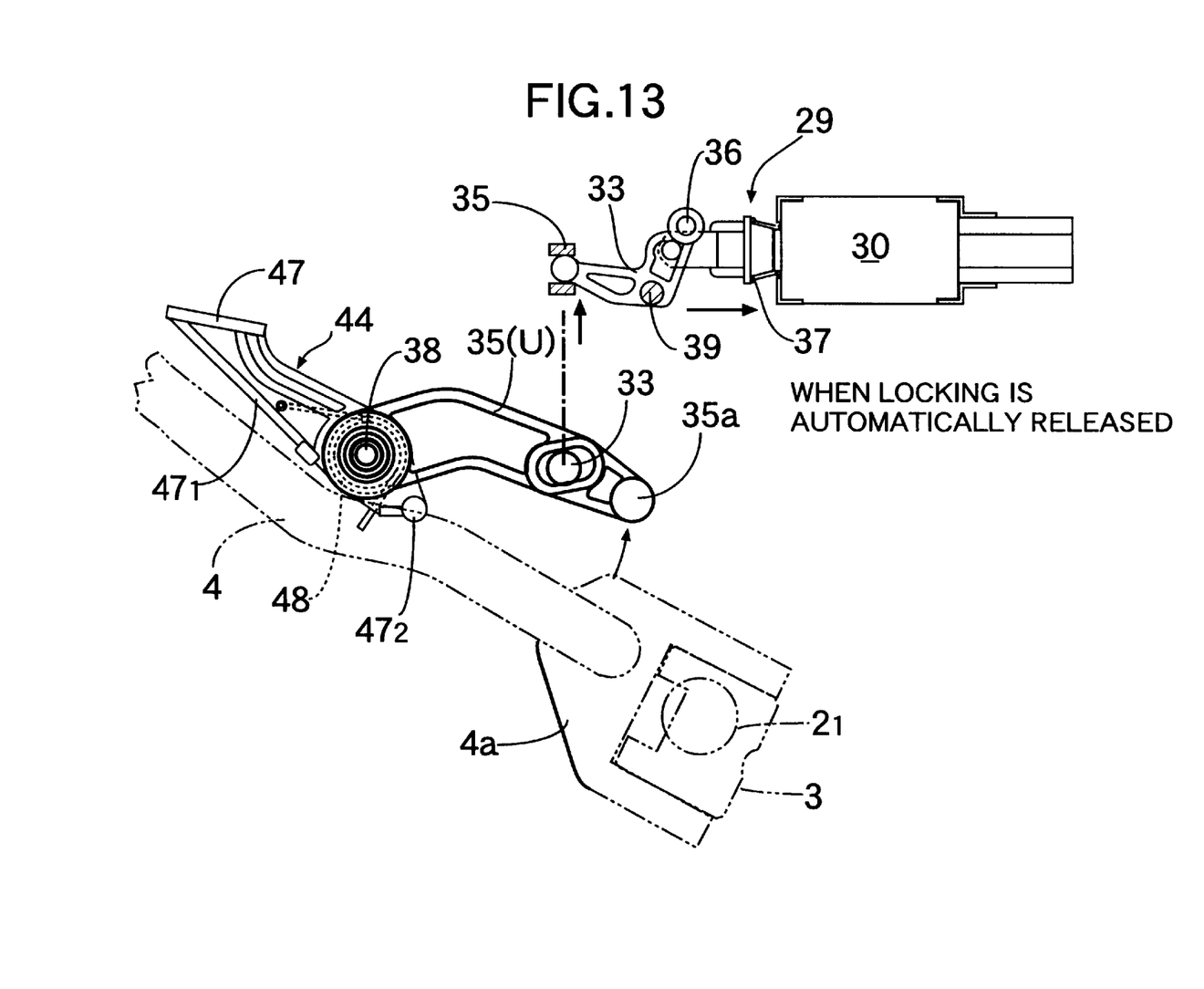
FIGS. 13 and 14 are views for explaining the operations of the shift lock device and the forcibly lock-releasing mechanism.
Figure 14:
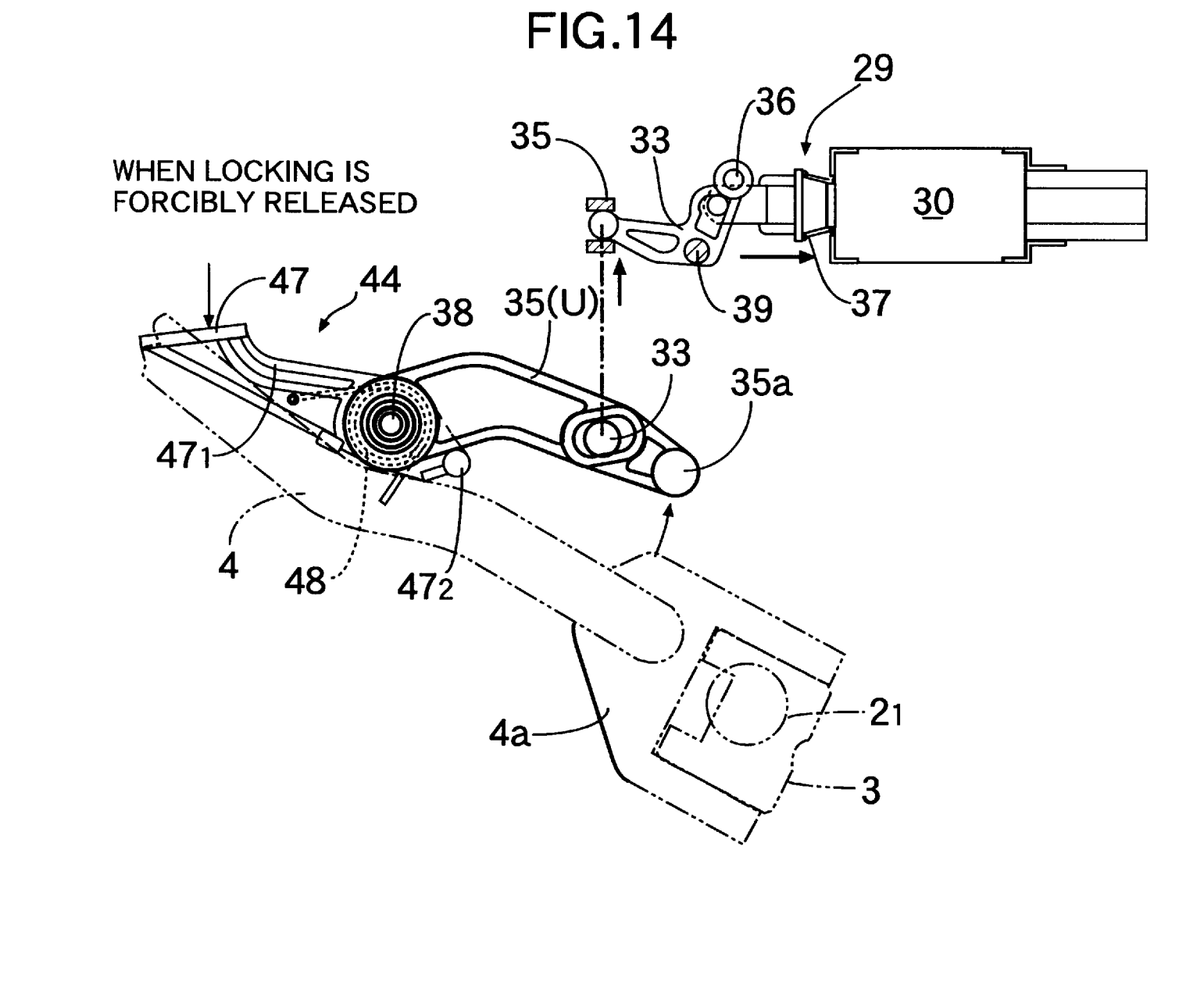

Thereupon, if the brake pedal is depressed down, the operating rod 36 is pulled by the excitation of the electromagnetic actuator 30, whereby the lock lever 35 is retreated to the unlocking position U. Therefore, the shift lever 4 can be swung about the second pivot $2_2$ to escape the engage claw 25 from the P-position maintaining groove 26p, and the second pivot $2_2$ and the shift piece 3 can be turned to any desired one of the shift positions by the shift lever 4.

On the other hand, when the shift lever 4 is to be turned from the position R to the position P, the electromagnetic actuator 39 is in its de-energized state to retain the lock lever 35 at the locking position L. However, the engage claw 25 pushes the lock lever 35 toward the unlocking position U against the force of the lock spring 37 and hence, the turning movement of the shift lever 4 to the position P is achieved. If the shift lever 4 brings the engage claw 25 into engagement in the P-position maintaining groove 26p, the lock lever 35 is returned again to the locking position L by the resilient force of the lock spring 37 to lock the shift lever 4 again.

Referring again to FIGS. 1, 2 and 12, a forcibly lock-releasing mechanism 44 is connected to the shift lock mechanism 29. The mechanism 44 is adapted to forcibly retreat the lock lever 35 to the unlocking position U by a manual operation, when the electromagnetic actuator 30 is fallen into an inoperable state due to over-charging of the battery or the like. The mechanism 44 includes a releasing lever 47 supported on the bracket 1 by a common pivot 38 along with the lock lever 35. The releasing lever 47 includes a tongue-shaped manipulating portion $47_1$ formed at one end to extend toward the operator, and an operating portion $47_2$ formed at the other end and adapted to push up the lock lever 35 to the unlocking position U. A return spring 48 is connected to the releasing lever 47 for biasing the operating portion $47_2$ away from the lock lever 35.

If the manipulating portion $47_1$ is urged by an engine key or the like, the releasing lever 47 can be turned to push up the lock lever 35 to the unlocking position U by the operating portion $47_2$. This ensures that even if the electromagnetic actuator 30 is in its inoperable state, the shift lever 4 can be shifted from the position P to any other desired shift position.

Although the embodiment of the present invention has been described in detail, it will be understood that the present invention is not limited to the above-described embodiment, and various modifications may be made without departing from the spirit and scope of the invention defined in claims. For example, the first pivot $2_1$ may be secured to the bracket 1 and on the other hand, the support bore 1a for supporting the first pivot $2_1$ may be provided in the shift piece 3. In addition, the thrust plate 10 may be supported on the first pivot $2_1$, so that it can be rotated freely relative to both of the bracket 1 and the shift piece 3.

What is claimed is:

1. A column shift device mounted to a steering column for an automatic transmission, comprising:

a bracket mounted to a steering column;

a shift piece on which a shift lever is supported;

a pivot secured to one of said bracket and said shift piece;

a support bore provided in the other of said bracket and said shift piece, said pivot being rotatably fitted in said support bore so that said shift piece is cantilevered on said bracket and is shiftable about said pivot to any of a plurality of shift positions, wherein said bracket and said shift piece have turning slide surfaces formed on opposed surfaces thereof which are in abutment against each other in an axial direction of said pivot, each of said turning slide surfaces having a diameter larger than an effective length of said pivot.

2. The column shift device according to claim 1, further including a thrust plate interposed between said turning slide surfaces of said bracket and said shift piece, said thrust plate having a friction coefficient lower than friction coefficients of said turning slide surfaces.

3. The column shift device according to claim 1 or 2, wherein each of said bracket and said shift piece is made of a synthetic resin.

4. The column shift device according to claim 3, wherein said thrust plate is formed with a positioning projection which is fitted in a positioning bore provided in one of said bracket and said shift piece.

* * * * *